United States Patent [19]

Prenzel et al.

[11] 4,019,614
[45] Apr. 26, 1977

[54] VEHICLE ELECTRONIC CLUTCH CONTROL

[75] Inventors: Karl Prenzel, Nuremberg; Adam Dittner, Hochstadt, both of Germany

[73] Assignee: Frieseke & Hoepfner GmbH Erlangen-Bruck, Erlangen-Bruck, Germany

[22] Filed: Dec. 1, 1975

[21] Appl. No.: 636,661

[30] Foreign Application Priority Data

Nov. 29, 1974 Germany ............................ 2456509

[52] U.S. Cl. ........................ 192/103 F; 192/3.58
[51] Int. Cl.² ..................................... F16D 43/284
[58] Field of Search .......... 192/103 F, 103 R, 3.56, 192/3.58

[56] References Cited

UNITED STATES PATENTS

| | | | |
|---|---|---|---|
| 3,372,602 | 3/1968 | Papst | 192/3.56 X |
| 3,645,366 | 2/1972 | Numazawa et al. | 192/3.56 X |
| 3,752,284 | 8/1973 | Brittain et al. | 192/103 F |
| 3,915,271 | 10/1975 | Harper | 192/103 R |

Primary Examiner—Benjamin W. Wyche
Attorney, Agent, or Firm—Toren, McGeady and Stanger

[57] ABSTRACT

After gears of a vehicle have been shifted, a controller compares the instantaneous difference between engine and transmission input speeds with the speed difference memorized during the gear shift, and automatically delays clutch reengagement, while the memorized difference is varied by factors including the engine speed and the minimum of engine and transmission speeds, until the resulting two differences reach a predetermined relation. This minimizes clutch wear and jolts.

3 Claims, 5 Drawing Figures

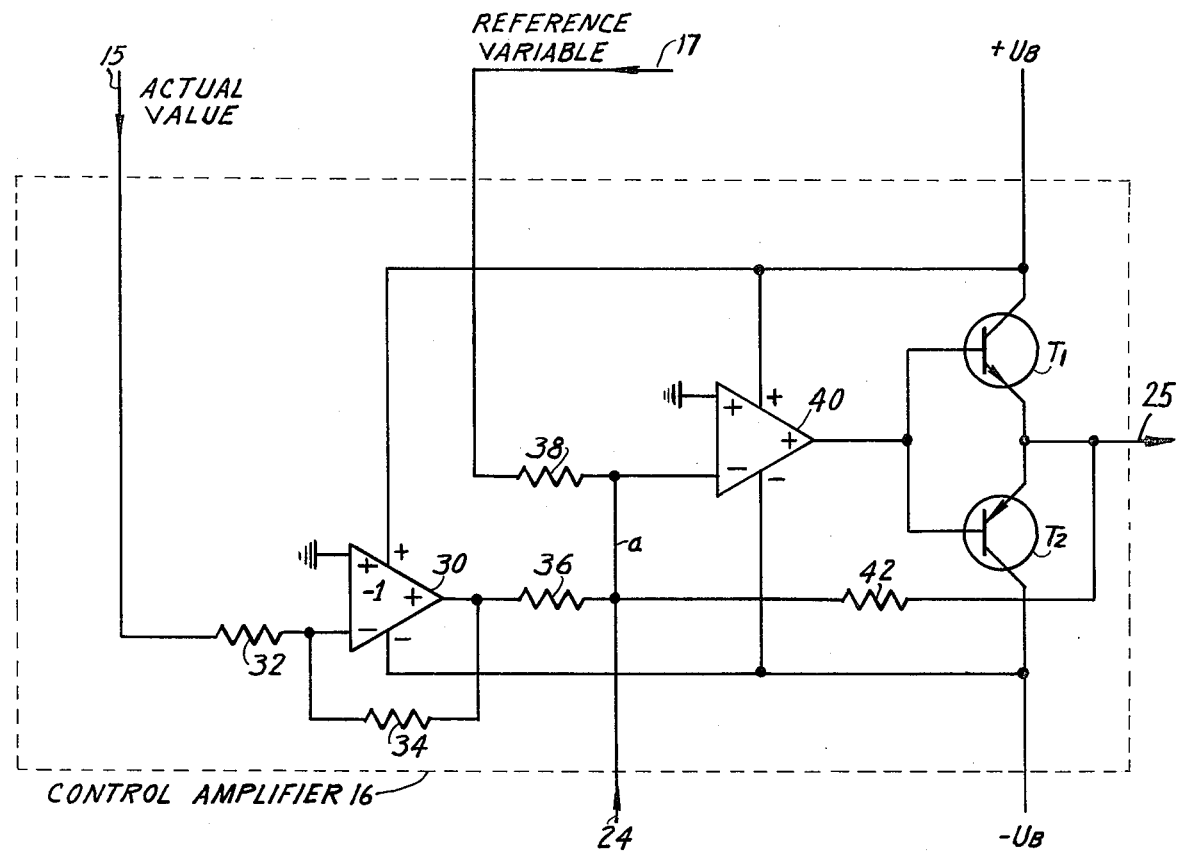
FIG. 3
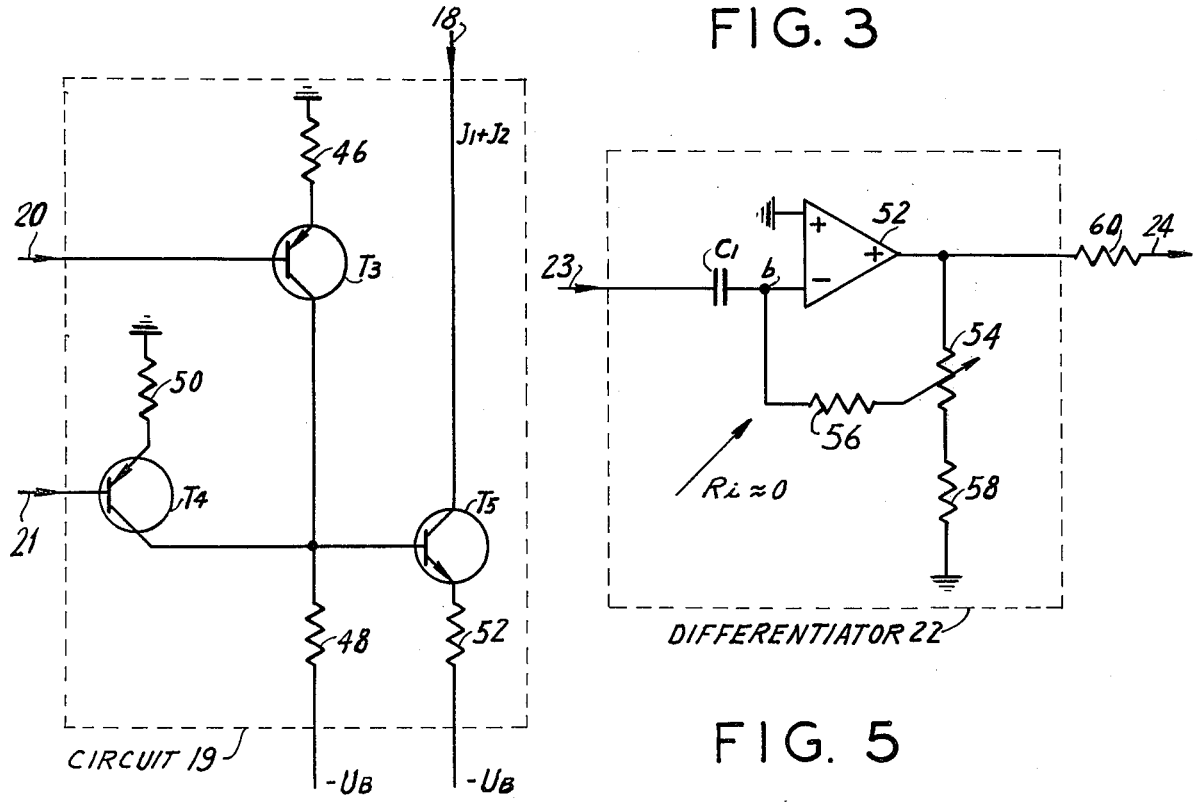
FIG. 4
FIG. 5

VEHICLE ELECTRONIC CLUTCH CONTROL

BACKGROUND OF THE INVENTION

This invention relates to motor vehicles such as trucks, and particularly to a method and apparatus for controlling a clutch between the engine and transmission or gearing of a motor vehicle, especially a heavy truck.

In heavy trucks the manner in which the clutch is disengaged and re-engaged can adversely affect the clutch wear, produce speed feedbacks to the engine, result in acceleration jolts, and ultimately subject the driver to undesirable physiological stresses.

In the drive mechanism of a heavy truck, the friction disc clutch is generally the weakest member in the torque transmission. Thus improper operation can easily destroy the clutch. Prior art systems have failed to minimize these effects.

An object of the invention is to improve motor vehicles, such as heavy trucks.

Another object of the invention is to improve clutch controls of motor vehicles such as trucks.

Still another object of the invention is to provide a motor vehicle in which the aforementioned adverse effects are minimized.

Yet another object of the invention is to provide a method and an apparatus, which upon command, automatically disengages the clutch of a vehicle and then re-engages the clutch in such a manner as to reduce clutch wear to a minimum, minimize speed feedback to the vehicles' engine and avoid sudden acceleration jolts so as to protect the transmission parts and limit physiological stresses upon the driver to the lowest possible level.

Another object is automatically to control the engagement of the clutch members so as to minimize the danger of excessive clutch wear.

SUMMARY OF THE INVENTION

According to an aspect of the invention, these objects are attained at least partially in a motor vehicle by continuously generating the difference between electrical signals representing the engine speed and transmission speed and also continuously generating a signal corresponding to the minimum of these two signals. When a driver produces a signal to disengage the clutch, the difference is memorized in a reference variable generator through a switch unit. To reengage the clutch, the engine-transmission signal difference is applied as a controlled variable to one input of a control amplifier whose output regulates a hydraulic positioning motor for the clutch, and whose other input receives the reference variable. The latter is changed by the aforementioned signal corresponding to the minimum on the one hand and the signal corresponding to the engine speed on the other. The control amplifier further receives an input signal corresponding to the angular acceleration of the difference between the engine speed and the transmission speed.

These and other features of the invention are pointed out in the claims. Other objects and advantages of the invention will be evident from the following detailed description when read in light of the accompanying drawings.

BRIEF DESCRIPTION OF THE DRAWINGS

FIGS. 3, 4 and 5 are schematic diagrams illustrating, respectively, details of a control amplifier, discharge circuit, and differentiator of FIG. 2.

DESCRIPTION OF PREFERRED EMBODIMENTS

Figure 1:
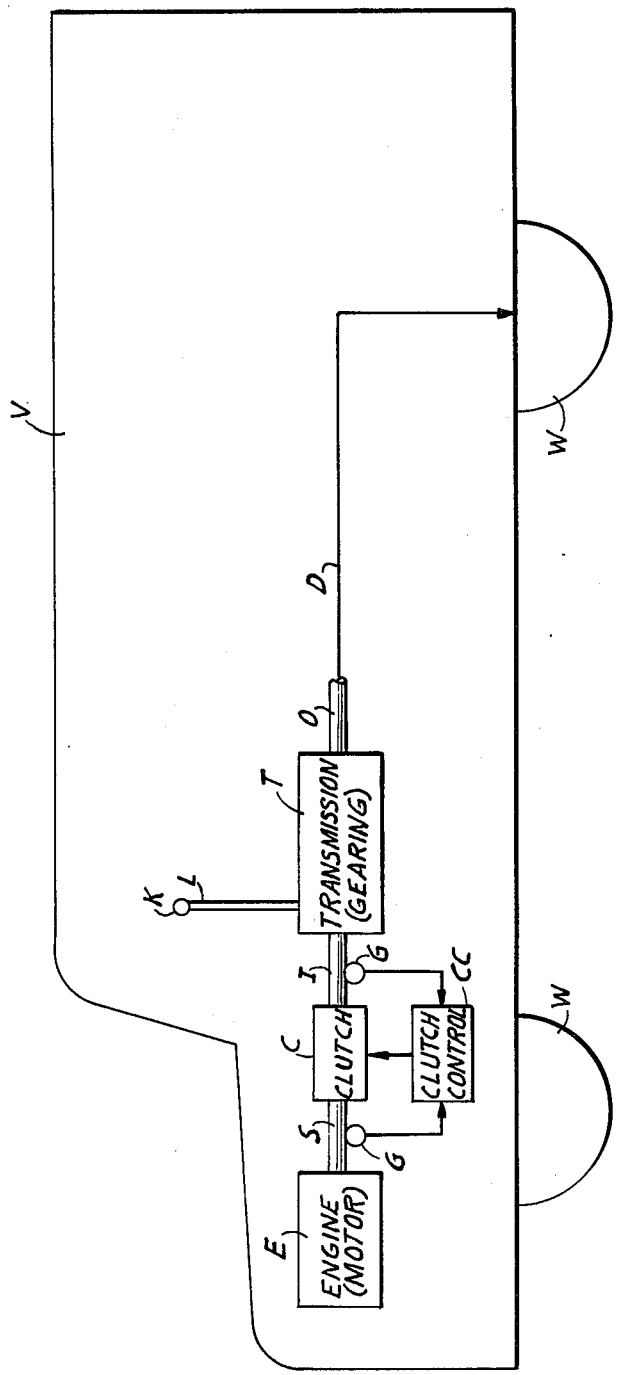
FIG. 1 is a diagrammatic view of a vehicle embodying features of the invention.

In FIG. 1, a vehicle V such as a truck, supports an engine E. When engaged, a clutch C in the vehicle V transmits rotary power from a crankshaft or output shaft S of the engine E to an input shaft or clutch shaft I of the vehicle's transmission T. The latter is also referred to as a gear system or gearing and is composed of the gears which transmits rotary power from the input shaft I to a transmission main shaft M at its output to drive the vehicle's wheels W. A clutch control CC controls the action of the clutch C in response to the angular speed of the engine at the output shaft S and at the input shaft I. A gear shift lever L which shifts gears in this transmission includes a contact K that closes when actuated by grasping the lever.

Hereafter, the terms such as "the angular speed of the engine" or the "number of revolutions per unit time of the engine", or the "engine speed" refer to the speed of the engine at the shaft S. Terms such as "the angular speed" of the transmission or gearing, or the "number of revolutions per unit time" of the transmission, or "transmission speed", refer to the speed of the shaft I.

Figure 2:
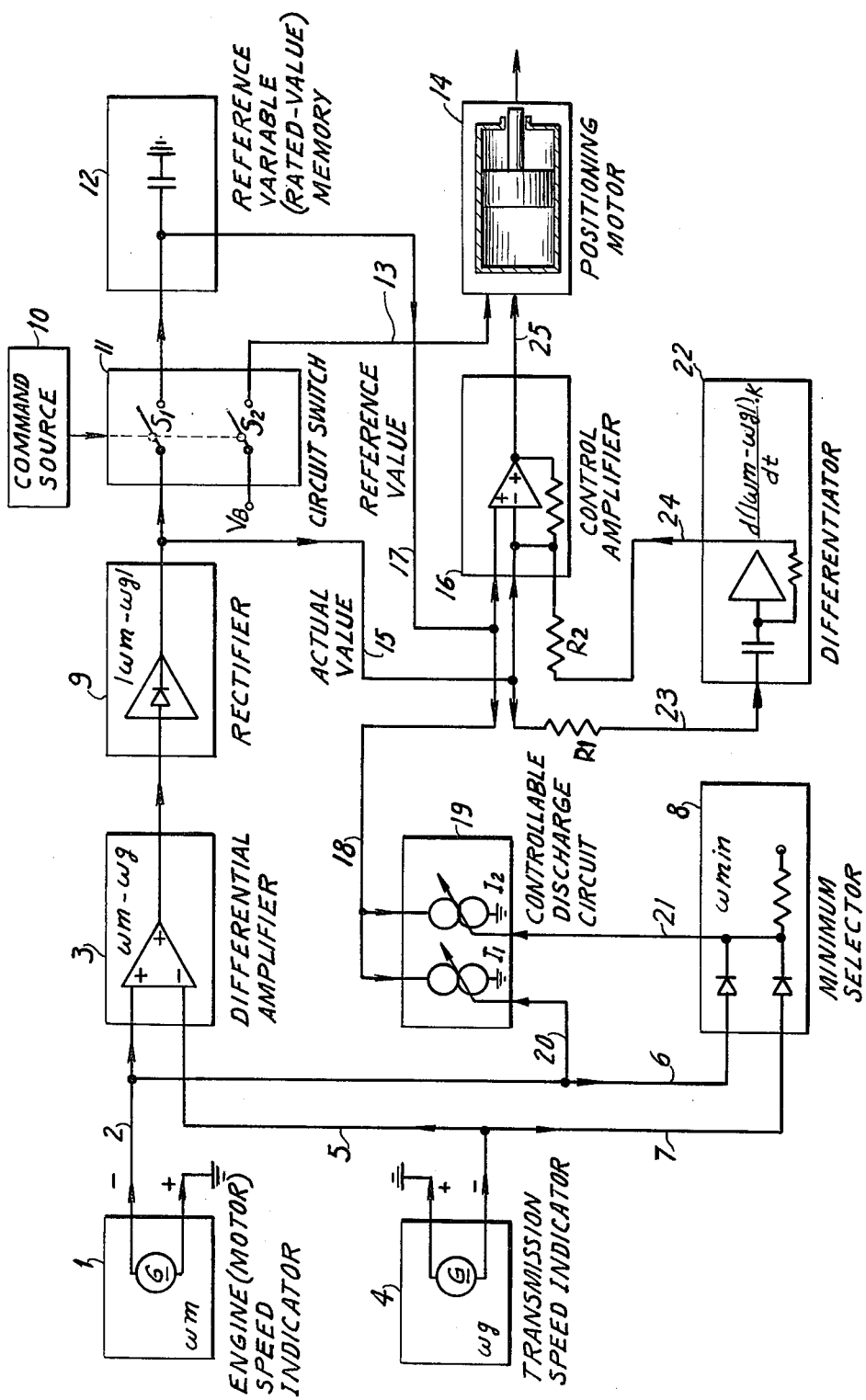
FIG. 2 is a schematic diagram illustrating details of a portion of the vehicle in FIG. 1.

FIG. 2 illustrates details of the clutch control CC. Here, a speed indicator 1 in the form of a tachometer generator, generates a signal corresponding to the number of revolutions per unit time, i.e., the angular speed of engine E at shaft S. A lead 2 transmits the generator signal from the indicator 1 to one input of a differential amplifier 3. A second speed indicator 4 coupled to the shaft I generates a signal corresponding to the number of revolutions per unit time, i.e., the angular speed, of the transmission. A lead 5 supplies the second signal to the other input of the differential amplifier 3.

Two leads 6 and 7 simultaneously feed the electrical signals respectively representing the engine speed and the transmission speed to a minimum selector 8.

An active rectifier 9 coupled to the output of the differential amplifier 3 rectifies the normally bipolar information appearing at the output of the differential amplifier 3 so that the output is always positive.

A command source or transmitter 10 responds to the contact K in the gear shift level to control a circuit switch 11.

According to one embodiment of the invention the source 10 is a relay coil which is energized through the contact K when gears are shifted and closes contacts S1 and S2 of the switch 11. The latter drives the clutch of the vehicle.

A lead 15 connects the output of the active rectifier to an input of a control amplifier 16. A lead 17 connects the other input of the control amplifier 16 to the reference-variable or nominal-value or rated-value memory 12. A lead 18 connects the other input of the control amplifier 16 to a controllable discharge circuit 19. The latter is connected by a lead 20 to the output of the speed indicator 1 and by a lead 21 to the minimum selector 8.

A differential circuit 22 has an input connected by a lead 23 to the output of the rectifier 9. An output lead 24 connects the output of the differentiator 22 to an input of the control amplifier 16. A lead 25 connects the output of the control amplifier to a hydraulic servo or positioning motor 14. The output of the control amplifier controls the hydraulic servo motor 14 by known means such as the servo devices disclosed in U.S. Pat. No. 2,767,689. The hydraulic servo motor is in fact a linear cylinder. Resistors R1 and R2, in the lines 23 and 24 respectively, have resistance values substantially greater than the input impedance of the control amplifier.

In operation, the output of the receifier 9, and consequently the output of the switching circuit 11 when switch S1 is closed, exhibits output information which corresponds to the rectified difference between the speeds of the engines and the gearing. Thus this output is always positive.

To shift gears, the driver releases the acceleration pedal and grasps the gear shift lever. This energizes the relay in the command source 10 which actuates the switching circuit 11 and causes it to close the contact S1 and S2.

In response, the contact S2 supplies the servo motor 14 with a starting current and disengages the clutch. Concurrently, the contact S1 connects the memory 12 to the output of the rectifier 9. This stores a signal corresponding to the instantaneous speed difference between the engine and transmission in the memory 12. The storage continues as long as the clutch is disengaged to pemit change of gears in the transmission.

The driver now moves the gear shift level L and shifts gears. The driver then releases the lever L. The command transmitter 10 actuates the switching device in the other direction. This opens the contacts S1 and S2. The memory 12 now has stored therein a value corresponding to the last difference between the engine speed at the shaft S and the transmission speed at the shaft I. The lead 17 supplies this value to one input of the control amplifier 16. Simultaneously the instantaneous difference appearing at the output of rectifier 9 in engine (or motor) speed and transmission speed is supplied as the actal value to the other input of the control amplifier.

In conjunction with the other stages, the control amplifier 16 controls the hydraulic servo (or positioning) motor 14. For this purpose, the memory 12 which according to an embodiment of the invention is in the form of a capacitor, must be discharged in a predetermined manner. This is accomplished by connecting the controllable discharge circuit 19 to the memory 12 through leads 17 and 18.

Two magnitudes act upon the discharge circuit 19. One of these magnitudes appears as a signal on the lead 20 and corresponds to the motor speed. The other magnitude appears as a signal on the lead 21 and corresponds to the smaller of the motor or gear speeds. This signal is generated by the minimum selector 8.

During start of the vehicle, for example, the gearing speed may be smaller than the engine speed. In this case, the selector 8 and the lead 21 transmits the signal representing the transmission speed to the discharge circuit 19.

Aside from the thus influenced nominal value and the actual value, as well as the "angular acceleration", i.e. the time rate of change, of the difference between the engine speed and the transmission speed all control the control amplifier.

A signal corresponding to this time rate of change of the difference appears at the differentiator 22. The latter is itself acted upon, at the line 23, by the actual value (the controlled variable), i.e., the instantaneous difference between the engine speed and the transmission speed.

In the sense of the invention, the optimal timed actuation of the clutch requires the following:

An optimal possible acceleration and a minimal coupling time in dependence upon the parameters established by the gas pedal position, such as the angular speed and torque on the one hand and the load on the other. This occurs by means of the two aforementioned control connections 20 and 21 for the controllable discharge circuit 19.

The connection 20 establishes an engine speed dependent control value in the discharge circuit 19. The thus established discharge circuit produces a predetermined discharge time for the memory 12, such as 4 seconds. This also results in a maximum clutch engagement time, which in turn limits the clutch's thermal overload, for example, while the vehicle is going uphill or as a result of selection of an erroneous gear. In order to maintain the clutch engagement time at a minimum, the minimum selector 8 and the connection 21 additionally controls the discharge current so as to increase it with rising gearing speed. This automatic operation reduces the clutch engagement time and adjusts the vehicle to its new traveling state. Both discharge current controls together furnish an optimal clutch engagement operation. The latter automatically provides the desired minimum clutch wear.

Simultaneously this creates a minimal feedback to the engine during clutch engagement. This arises from automatic reduction in the discharge current due to the discharge current control over the connection 20 in dependence upon the motor speed, if for example, the motor speed drops suddenly for any reason.

Because of the different frictional relationships, impacting the two clutch halves or members can create oscillations which could further lead to acceleration jolts. This would in turn result in a higher degree of wear of the gearing parts and would case annoyance to the driver. The differentiator 22 is provided to avoid this. Because the aforementioned oscillations appear as rapid changes in the actual values on connection 15, the opposing action of the differentiator 22 and the control amplifier 16 upon the clutch compensate for their effects.

The invention minimizes clutch wear and smooths jolts which might otherwise occur.

FIG. 3 illustrates details of the control amplifier 16. Here, an operational amplifier 30 with equal resistors 32 and 34 inverts the input along the line 15. It thus multiplies it by −1. The input along the line 15 arrives from the rectifier 9 and represents what has been termed the "actual value" or "controlled variable". Two resistors 36 and 38 form a summing network at the point $a$, resistor 36 applies a negative of the value at line 15, and resistor 38 the value at line 17, to the point $a$. Therefore, these values are compared at the point $a$. An operational amplifier 40 coacting with the resistors 36 and 38 as well as a resistor 42 and two push-pull emitter-follower transistors T 1 and T 2, amplifiers the difference between the so-called actual and reference values. The line 25 applies the output to the positioning motor 14. The value of the resistor 42 establishes the amount of amplification.

Essentially, the inverting nature of the operational amplifier 30 is important because it serves to produce the difference between the reference and actual value at the point a. While the values of the resistors 32, 34, 36 and 42 may be chosen as required, examples of these values are 10k, 10k, 10k, 10k and 100k respectively.

FIG. 4 illustrates an example of the details which may be used in the controllable discharge circuit 19. In this example, the circuit 19 is composed of transistors T 3, T 4 and T 5, as well as resistors 46, 48, 50 and 52. The Transistor T 3 and its emitter resistor 46 transforms the voltage provided at the lead 20 to a proportional current. The voltage at lead 20 then becomes available as a current-dependent voltage component across the collector resistor 48. Similarly there exists across the resistor 48 another component value corresponding to the voltage at the lead 21. A transistor T 4 with the emitter resistor 50 transforms this voltage at the lad 21 to a current proportional thereto. Both currents are added at the resistor 48. These currents control the discharge of the reference-variable memory 12 (over the leads 17 and 18) through a transistor T 5 with its emitter resistor 52.

FIG. 5 illustrates details of components usable as the differentiator 22. Here, the input resistance $r_i$ at the input b of amplifier 52 is very low and approaches 0. Thus, the signal established at the lead 23 can be differentiated by the capacitor C 1. A potentiometer 54 and a resistor 56 establish the operating parameters of the differentiator. A resistor 58 is a grounding resistor and resistor 60 is a resistor comparable to the resistors 36 and 38 in the control amplifier 16.

Various values can be used in this circuit but sample values are 1 microfarad, 10k, 100k, 1k and 10k, for C 1, 54, 56, 58 and 60.

When the positioning motor 14 is unenergized by current, the clutch actuated by the positioning motor is engaged. During movement of the vehicle the switch S 2 is open. No control signal appears at the input 25 because the clutch is engaged as required. During a gear change, S 2 closes and the hydraulic positioning motor 14 receives maximum current through the lead 13. This completely disengages the clutch. After the resulting gear change the memory 12 stores a signal corresponding to the last difference between engine and transmission speeds during the gear change. If, for example, the clutch halves, which are coupled to the transmission on the one hand and the engine on the other, exhibit a substantial speed difference, the memory 12 also exhibits a relatively high voltage. Similarly, a small speed difference results in a small voltage at the memory 12.

The control amplifier 16 serves to make the engine and transmission speed difference (the controlled variable or actal value) follow the reference variable, which appears on the lead 17 and decreases in a specific manner determined by the circuit 19, as exactly as possible during the engagement operation.

During engagement, unevenness may be produced by differential friction differences in the clutch members. The control amplifier 16, which has the characteristics of a proportional regulator, cannot eliminate such disturbing uneveness. The differentiator 22 overcomes this problem by providing a supplementary feedback value to the control amplifier. The differentiation function of the differentiator 22 cases it to respond immediately to choppy (or bumpy) and relatively fast changes in the reference value.

The differentiator 22 applies a supplementary control signal to the control amplifier 16 over the lead 22. The control signal counteracts spasmodic changes in the reference value.

While embodiments of the invention have been described in detail, it will be obvious that the invention may be embodied otherwise without departing from its spirit and scope.

What is claimed is:

1. A method of controlling the clutch between an engine and transmission of a vehicle during shifting of gears in the transmission, comprising, forming a difference signal corresponding to the difference between the engine speed and the transmission speed, forming a minimum signal corresponding to the minimum of the engine speed and transmission speed, disengaging the clutch and storing the difference signal in a memory as a reference variable in response to start of shifting gears until the gears are shifted, after shifting of the gears delaying reengagement of the clutch with a control amplifier in response to the difference signal and the reference variable applied to the inputs of the control amplifier until a predetermined relationship exists between the difference signal and reference variable, varying the reference variable in response to the engine speed and the minimum signal, and varying the input carrying the difference signal in response to an auxiliary signal including the time rate of change of the difference signal.

2. An apparatus for controlling the clutch between an engine and transmission of a vehicle during shifting of gears in the transmission, comprising, electrical means coupled to the engine and transmission for forming a difference signal corresponding to the difference between the engine speed and the transmission speed and for forming a minimum signal corresponding to the minimum of the engine speed and transmission speed, memory means responsive to disengagement of the clutch and coupled to the electrical means storing the difference signal in a memory as a reference variable in response to start of shifting gears until the gears are shifted, delay means coupled to said electrical means and said memory means and responsive to completion of shifting of the gears for delaying reengagement of the clutch in response to the then occurring difference signal and the reference variable until a predetermined relationship exists between the difference signal and reference variable, varying means coupled to said electrical means and said memory means for varying the reference variable in response to the engine speed and the minimum signal and varying the then occurring difference signal in response to an auxiliary signal including the time rate of change of the difference signal.

3. A vehicle, comprising an engine, a transmission having shiftable gears, a clutch between said engine and said transmission comprising, electrical means coupled to the engine and transmission for forming a difference signal corresponding to the difference between the engine speed and the transmission speed and for forming a minimum signal corresponding to the minimum of the engine speed and transmission speed, memory means responsive to the disengagement of the clutch and coupled to the electrical means storing the difference signal in a memory as a reference variable in response to start of shifting gears until the gears are shifted, delay means coupled to said electrical means and said memory means and responsive to completion of shifting of the gears for delaying reengagement of the clutch in response to the difference signal and the reference variable until a predetermined relationship exists between the difference signal and reference variable, varying means coupled to said electrical means and said memory means for varying the reference variable in response to the engine speed and the minimum signal and varying the difference signal in response to an auxiliary signal including the time rate of change of the difference signal.

* * * * *